(12) United States Patent
Yadlowsky

(10) Patent No.: US 6,441,954 B1
(45) Date of Patent: Aug. 27, 2002

(54) OPTICAL AMPLIFIER WITH WIDE FLAT GAIN DYNAMIC RANGE

(75) Inventor: Michael J. Yadlowsky, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/647,423

(22) PCT Filed: Feb. 9, 1999

(86) PCT No.: PCT/US99/02637
§ 371 (c)(1),
(2), (4) Date: Sep. 28, 2000

(87) PCT Pub. No.: WO99/50937
PCT Pub. Date: Oct. 7, 1999

Related U.S. Application Data
(60) Provisional application No. 60/080,128, filed on Mar. 31, 1998.

(51) Int. Cl.[7] .............. G02B 6/00; G02F 1/35; H01S 3/00
(52) U.S. Cl. ............ 359/341.31; 359/341.33; 372/70
(58) Field of Search ............ 39/341.31, 341.3, 39/341.33; 372/70

(56) References Cited

U.S. PATENT DOCUMENTS

| | | | |
|---|---|---|---|
| 4,414,671 A | * 11/1983 | Wells et al. | 372/70 |
| 5,140,456 A | * 8/1992 | Huber | 372/70 |
| 5,185,826 A | * 2/1993 | Delavaux | 359/345 |
| 5,218,608 A | * 6/1993 | Aoki | 359/341 |
| 5,861,981 A | * 1/1999 | Jabr | 359/341 |

FOREIGN PATENT DOCUMENTS

JP  4289829  * 10/1992

OTHER PUBLICATIONS

Yadlowsky, M.J., IEEE Photonics Technology, Letters,, vol. 11, #5, May 1999.*
Takano, et al, Proc. of 1995 ICICR General Conference, Mar. 1995, B–1067, article 16; with translation.*

* cited by examiner

*Primary Examiner*—Nelson Moskowitz
(74) *Attorney, Agent, or Firm*—Svetlana Z Short

(57) ABSTRACT

An optical amplifier comprises an optical fiber segment doped with impurity ions such as erbium for providing optical gain for an optical signal propagating in the optical fiber segment. A first source of a first pumping wavelength pumps the ions from a first ground state to a second metastable state. The metastable state decays to the ground state by stimulated emission to provide the optical gain. A second source of a second pumping wavelength pumps the ions from the ground state to a third auxiliary state. The auxiliary state decays to the metastable state. Thus, by controlling the pumping power in one or both pumping wavelengths, it is possible to control the fraction of ions in the metastable state. This in turn permits control of an overall scale factor of the gain spectrum without substantially affecting the shape of the gain spectrum.

19 Claims, 4 Drawing Sheets

······ dyn gain tilt function
···■··· Fig. 3A data
——— Fig. 3B data

OPTICAL AMPLIFIER WITH WIDE FLAT GAIN DYNAMIC RANGE

This application claims the benefit of provisional application Ser. No. 60/080,128, filed Mar. 31, 1998.

FIELD OF THE INVENTION

The present invention relates to an optical fiber amplifier and, in particular, to a method for varying an overall scale factor of the gain spectrum of the optical fiber amplifier without substantially changing the shape of the gain spectrum. Thus, while in a conventional erbium doped fiber amplifier (EDFA), the magnitude and shape of the gain spectrum are completely coupled, the present invention provides a technique for decoupling the magnitude and shape of the gain spectrum of an EDFA.

BACKGROUND OF THE INVENTION

Achieving a uniform or flat gain spectrum is desirable for optical amplifiers used in wavelength-multiplexed communication systems. The gain flatness of an EDFA can be optimized by using host glass materials for the erbium that produce flat gain spectra (e.g., aluminum codoped silica or fluoride glasses such as ZBLAN) and operating the amplifier at an average inversion that provides optimally flat gain in the spectral region of interest (C. R. Giles and D. J. D. Giovanni, "Spectral dependence of gain and noise in erbium-doped fiber amplifiers," *IEEE Photonics Technology Letters,* vol. 2, pp. 797–800, 1990). The gain flatness can further be improved through the use of gain flattening filters (M. Tachibana, R. I. Laming, P. R. Morkel, and D. N. Payne, "Erbium-doped fiber amplifier with flattened gain spectrum," *IEEE Photonics Technology Letters,* vol. 3, pp. 118–120, 1991). All of these techniques, however, only provide the optimum gain flatness at a single gain value (i.e., gain at any particular wavelength). It is well known that if the gain of an EDFA is changed by changing the inversion (e.g., by changing the relative pumping rate), the gain changes in a well defined spectrally dependent manner (C. R. Giles and D. J. D. Giovanni, "Spectral dependence of gain and noise in erbium-doped fiber amplifiers," *IEEE Photonics Technology Letters,* vol. 2, pp. 797–800, 1990; J. Nilsson, Y. W. Lee, and W. H. Choe, "Erbium doped fibre amplifier with dynamic gain flatness for WDM.," *Electronics Letters,* vol. 31, pp. 1578–1579, 1995). As a result, if a conventional EDFA is used in an application where its gain needs to be different from the flattest gain of the amplifier, its gain spectrum will show excess normalized gain ripple ((maximum gain—minimum gain)/minimum gain as calculated on the wavelength band of interest).

An example of how this can be a problem is provided by an optically amplified fiber transmission system where one needs to support fiber spans shorter than those for which the amplifier is designed. It is typically impractical to have separate amplifiers custom designed for each fiber span. Therefore, one is either forced to have an amplifier with a distorted gain spectrum or to add enough loss to the system that the design gain is actually needed from the amplifier. The latter uses more optical power than a redesigned amplifier would and has inferior noise performance, even if the loss is added between stages of an EDFA (Y. Sugaya, S. Kinoshita, and T. Chikama, "Novel configuration for low-noise and wide-dynamic-range Er-doped fiber amplifier for WDM systems," in Optical Amplifiers and their Applications, 1995 OSA Technical Digest Series, Vol. (Optical Society of America, Washington, D.C.) 158–161).

It is an object of the present invention to provide a novel technique which enables one to change an overall scale factor of a gain spectrum of an optical amplifier such as an EDFA without substantially changing the shape of the gain spectrum. More generally, it is an object of the invention to provide a technique for decoupling the magnitude and shape of the gain spectrum of an EDFA or other optical amplifier. (The two are completely coupled in a conventional EDFA.) Thus, using the present invention, it is possible to provide an EFDA in a span which is shorter than the design span without adding attenuation, by controlling the scale factor of the gain spectrum.

Gain can be obtained in an EDFA when some fraction of the erbium dopant ions are excited into the metastable $^4I_{13/2}$ state. A signal band photon (wavelength typically 1525–1600 nm) incident upon an excited ion can stimulate the release of a photon identical to itself and cause the erbium ion to return the $^4I_{15/2}$ ground state. Silica based EDFAs used in telecommunication systems are typically pumped at wavelengths near (+/−~25 nm) 1480 nm or 980 nm. As shown in FIG. 1, the former directly excites the ions from the ground state to the metastable level, whereas the latter makes use of the auxiliary $^4I_{11/2}$ state. Other pump bands are possible, but lower power conversion efficiency is typically found in 650 nm and 800 nm bands due to excited state absorption (ESA) and consequently they are not used in commercial systems.

The gain spectrum of an EDFA can be approximately written as $$G_{dB}(\lambda)=10\log_{10}(e)\Gamma(\lambda)L_{EDF}[\overline{N_2}\sigma_e(\lambda)-\overline{N_1}\sigma_a(\lambda)] \quad (1)$$

where $G_{dB}$ is the amplifier gain in decibels, $L_{EDF}$ is the total length of the erbium-doped fiber (EDF) within the amplifier, $\sigma_e$ and $\sigma_a$ are the emission and absorption cross sections, respectively, and $N_1$ and $N_2$ are average populations (ions per unit volume) of the ground state and metastable levels, respectively (C. R. Giles and E. Desurvire, "Modeling erbium-doped fiber amplifiers," *Journal of Lightwave Technology,* vol. 9, pp. 271–283, 1991). The local fractional average inversion (i.e., inversion averaged over a cross section of the fiber at a particular axial point) is calculated as $$\overline{n_i} = \frac{1}{L}\int_0^L dz' \quad (2)$$

$$\int_0^{doping\ radius} r dr N_i(r,z')/[N_1(r,z')+N_2(r,z')] \quad \{i=1,2\}.$$

which will be convenient for re-writing the form of Eqn. (1) below.

EDFAs are typically used such that nearly all erbium ions are in the metastable $^4I_{13/2}$ level (level 2) or the ground state $^4I_{15/2}$. This is because efficiency reducing ESA is likely to be a problem if this is not the case. When pumping in the 980 band, ions are predominantly moved from the ground state to the $^4I_{11/2}$ level. In silica this state has a short lifetime on the order of 10 μs and the ions undergo non-radiative decay to the metastable state. Because the lifetime of the $^4I_{11/2}$ level is so much shorter than that of the metastable (at the power levels typically encountered in commercial communication systems) the population of this level is typically negligible. In low phonon energy glasses (i.e., glasses with a phonon energy significantly lower than in silica) such as ZBLAN, the $^4I_{11/2}$ level has a lifetime on the order of 10 ms which is a large fraction of that of the metastable. Furthermore, there is an ESA within the 980 nm pump band which results in the excitation of an ion from the $^4I_{11/2}$ to the $^4I_{7/2}$ state and this process can reduce the efficiency of the amplifier. As a result, EDFAs made out of low phonon energy glasses have typically not been pumped in the 980 nm band. Recently, there has been work at finding 980 nm band wavelengths which would provide efficient amplification primarily for obtaining a high inversion to get a low noise figure (good noise performance) (M. Yamada, Y. Ohishi, T. Kanamori, H. Ono, S. Sudo and M. Shimizu, "Low-noise and gain-flattened fluoride-based $Er^{3+}$-doped fiber amplifier pumped by 0.97 μm laser diode," Optics Letters, vol. 33, pp. 809–810, 1997; M. Yamada, Y. Ohishi, T. Kanamori, S. Sudo and M. Shimizu, "Low-noise and gain-flattened fluoride-based $Er^3$+-doped fiber amplifier pumped by 0.97 μm laser diode," Optics Letters, vol. 22, pp. 1235–1237, 1997). Good power conversion efficiencies have yet to be demonstrated, though, so cost effective 980 nm band pumping has yet to be proven. Since $N_1+N_2$ is approximately equal to the total number of active erbium ions in the amplifier, Eqn. 1 can be written in terms of fractional populations as $$G_{dB}(\lambda) = 10 \log_{10}(e)\Gamma N_{tot} L_{EDF}[\overline{n_2}(\sigma_e+\sigma_a)-\sigma_a] \quad (3)$$

where $n_i=N_i/N_{tot}$. In Eqn. 1, all of the variables on the right side of the equation, except $n_2$, are fixed once the EDF has been manufactured, cut to length and constructed into an amplifier. Therefore, if the gain of the amplifier is to be changed, $n_2$, the average inversion, needs to be changed. However, $\Delta G_{dB}/\Delta n_2$, the change in the gain per $\Delta n_2$ change in inversion, is proportional to $\Gamma(\sigma_e+\sigma_a)$ which is spectrally dependent. As a result, the gain of a conventional EDFA cannot be increased or decreased in a spectrally uniform manner. Instead, if steps are taken to increase or decrease the gain at a particular wavelength, the shape of the gain spectrum as a function of wavelength will be distorted.

In view of the foregoing, it is a further object of the invention to provide an EFDA in which the gain can be increased or decreased in a spectrally uniform manner. In other words, it is an object of the invention to provide an EFDA or other optical fiber amplifier an overall scale factor of the amplifier gain spectrum may be adjusted substantially independently of the shape of the gain spectrum.

Dual or multiple wavelength (or hybrid) pumping of erbium-doped fiber amplifiers (EDFAs) has been proposed to achieve a number of goals (see U.S. Pat. No. 5,710,659). For example, 980 nm pumping is typically used in the first stage because it can achieve a full inversion of the erbium ions and thus attain the best possible noise performance. On the other hand, 1480 nm pumped gain stages can have a better power conversion efficiency than 980 nm pumped stages (a smaller fraction of the less energetic 1480 nm photons are dissipated within the amplifier in order to generate 1530 nm signal photons) and 1480 nm pump lasers may cost less in some cases. Thus, a two stage amplifier in which the first is pumped with 980 nm and the second is pumped with 1480 nm may combine some of these advantages. This approach could then be extended to a single gain stage by simply pumping it from opposite ends with different pump wavelengths. This provides the added benefit of making it possible to combine multiple pumps.

In contrast to the foregoing, it is a particular objective of the invention to provide an EDFA in which the gain can be increased or decreased in a spectrally uniform manner using multiple pumping wavelengths.

SUMMARY OF THE INVENTION

In the present invention, one or more auxiliary "pump" or control wavelengths are used such that some fraction of the dopant ions may be intentionally placed into states other than the ground state or the metastable level such that $N_{tot}>N_1+N_2$. In this case, Eqn. (1) can be written as $$G_{dB}(\lambda) = 10\log_{10}(e)\Gamma L_{EDF} N_{tot}\left[\frac{\overline{N_1}+\overline{N_2}}{N_{tot}}\right]\{\overline{n_2}[\sigma_e(\lambda)+\sigma_a(\lambda)]-\sigma_a(\lambda)\} \quad (4)$$

The shape of the gain spectrum in this case is again determined by the relative average inversion $n_2$, but the overall scale factor of the gain spectrum is now proportional to the term $f_{act}=[(N_1+N_2)/N_{tot}]$ which is typically unity or not controlled in current EDFAs. However, according to the invention, fat can be brought to less than unity and controlled such that the same gain spectral shape can be preserved at different absolute gain values. In a more general sense, the shape of the amplifier's gain spectrum can be separated from the absolute gain itself. As a result, an amplifier can be designed to be a flexible "dynamic gain tilt" compensator. Its gain shape can be tuned to cancel imbalances arising from dynamic gain tilt in other amplifiers in a cascade. Its absolute gain level could then be adjusted to match the power levels needed by, e.g., link terminal equipment.

One illustrative embodiment of the invention, which implements the foregoing may be described as follows. An optical amplifier comprises an optical fiber segment doped with impurity ions for providing optical gain for an optical signal propagating in the optical fiber segment.

A first source of a first pumping wavelength pumps the ions from a first ground state to a second metastable state. The metastable decays state to the ground by stimulated emission to provide the optical gain. A second source of a second pumping wavelength pumps the ions from the ground state to a third auxiliary state. The auxiliary state decays spontaneously down to the metastable state. Thus, by controlling the pumping power in one or both pumping wavelengths, it is possible to control the fraction of ions in the metastable state. This in turn permits control of an overall scale factor of the gain spectrum without substantially affecting the shape of the gain spectrum.

Illustratively,
(a) the ions are erbium
(b) the first pumping wavelength is 1480 nm
(c) the metastable state is $^4I_{13/2}$
(d) the second pumping wavelength is 980 nm, and
(e) the third state is $^4I_{11/2}$.

Preferably, the optical fiber segment is formed of a low phonon energy glass such as ZBLAN. (Other low phonon energy glasses include tellurites and cesium aluminates). In this case, the lifetime of the auxiliary state is a significant fraction of the lifetime of the metastable state. This makes it possible to control the population of the metastable state and thus the scale factor of the gain spectrum by pumping a fraction of the ions into the auxiliary state.

DETAILED DESCRIPTION OF THE INVENTION

In accordance with an illustrative embodiment of the invention, in an EDFA, one way to reduce $f_{act}$, the fraction of the erbium ions that are able to provide gain, is to pump an EDF that has a long lifetime (e.g. >1 ms) in the $^4I_{11/2}$ level at both 1480 nm and 980 nm. The total amount of power provided by each of the pump sources may be adjustable to generate the full range of available gain spectra. The 1480 nm band pump directly moves ions from the ground state to the $^4I_{13/2}$ metastable level. The 980 nm band pump moves ions directly from the ground state to the $^4I_{11/2}$ auxiliary state. Erbium ions excited by the 980 nm band pump light on average are delayed by a time equal to the lifetime of $^4I_{11/12}$ level before spontaneously decaying down to the metastable level where they can take part in the amplification process. As a result, some fraction of the erbium dopant ions will occupy the $^4I_{11/2}$ (and due to ESA higher levels) and $f_{act}$ will be reduced below unity. The longer the lifetime of the auxiliary state, the less power it takes to "sideline" some fraction of the ions using the auxiliary or control pump laser.

In short, in accordance with the present invention, an optical amplifier such as an EDFA is operated so that a controllable fraction of the active dopant ions are in an energy state such that they (temporarily) do not interact with the optical signal being amplified for the purpose of independently controlling the shape and magnitude of the gains of the optical amplifier. Preferably, the time it takes for a dopant ion to leave the ground state and arrive at the metastable state via the auxiliary state takes at least 1 or 2 ms (in the case of ZBLAN, it is 10 ms).

Figure 1:
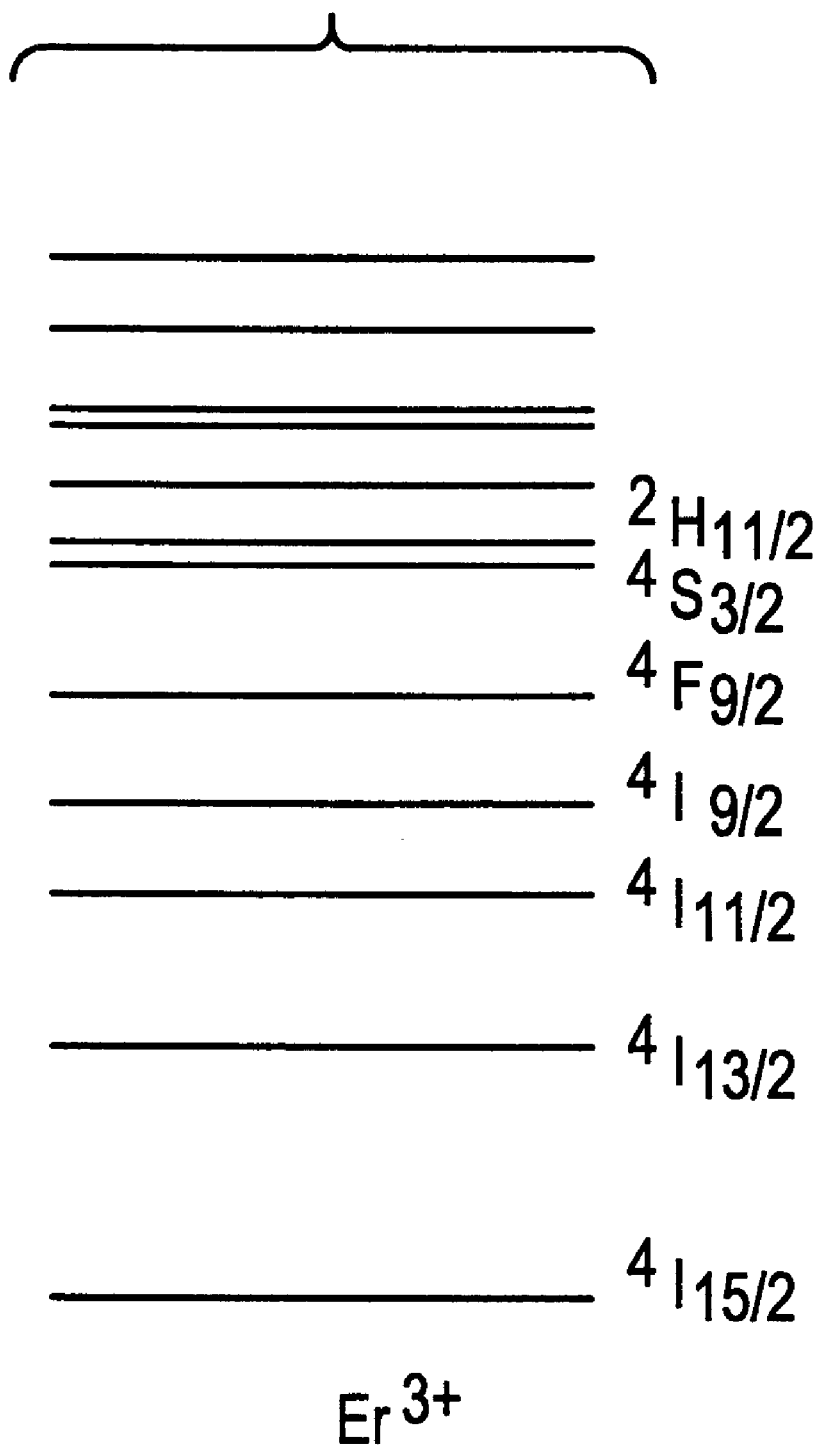
FIG. 1 is an abbreviated energy level diagram of Er3+.
Figure 2:
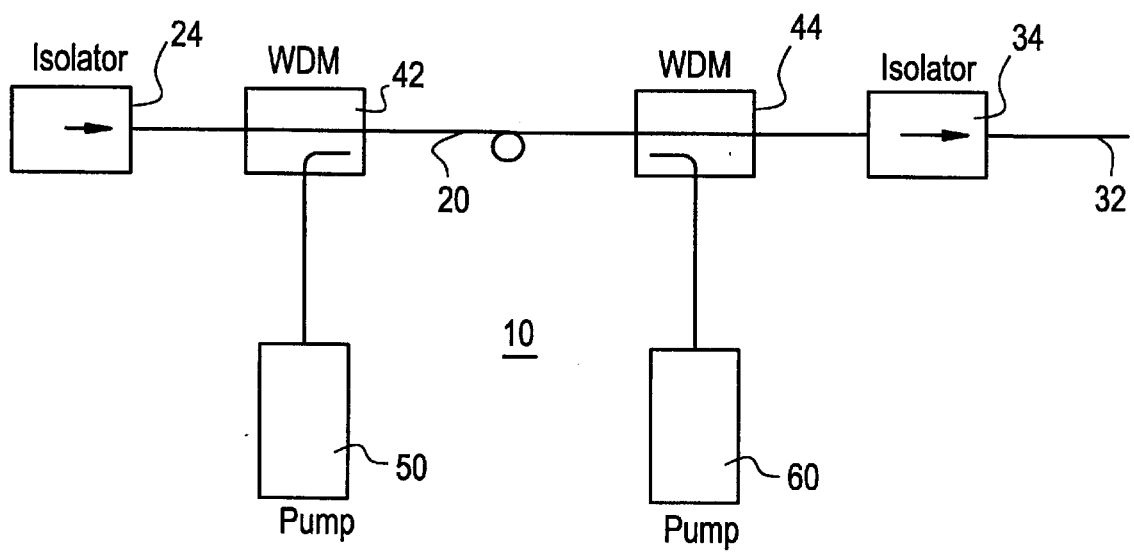
FIG. 2 schematically illustrates an optical fiber amplifier according to an illustrative embodiment of the invention.

FIG. 2 schematically illustrates an optical fiber amplifier which operates in accordance with the present invention. The optical fiber amplifier 10 comprises an erbium doped optical fiber segment 20. Illustratively, the fiber segment 20 is a 4.6 m segment of ZBLAN doped with erbium at 1000 ppm. Preferably, the fiber 20 is formed from a low phonon energy glass such as ZBLAN so that the auxiliary state $^4I_{11/2}$ has a relatively long life. An optical signal to be amplified enters the amplifier 10 at the input port 22 and passes through the isolator 24. The optical signal has a wavelength in the 1525–1600 nm band or perhaps out to 1700 nm. The amplified optical signal passes through the isolator 34 and exits the amplifier system via the output port 32. The amplifier 10 includes two pumps 50 and 60. The pump 50 is a laser in the 980 nm band. The optical energy in the 980 nm pumping band is coupled into the fiber 20 by the WDM (Wavelength Division Multiplexer) 42 and propagates in the fiber 20 codirectionally with the optical signal. The pump 60 is a laser in the 1480 nm band. The optical energy in the 1480 nm pumping band is coupled into the fiber 20 by the WDM 44 and propagates counter-directionally with the optical signal.

The invention can also be implemented with the reverse arrangement (980 nm pump power counter-propagating with the signal and the 1480 nm band pump co-propagating). Having the 980 nm pump power counter-propagating with the signal can be advantageous for reducing the noise figure of the amplifier if a pump wavelength near 970 nm is used (M. Yamada, Y. Ohishi, T. Kanamori, H. Ono, S. Sudo and M. Shimizu, "Low-noise and gain-flattened fluoride-based $Er^{3+}$-doped fiber amplifier pumped by 0.97 μm laser diode," *Optics Letters*, vol. 33, pp. 809–810, 1997; M. Yamada, Y. Ohishi, T. Kanamori, S. Sudo and M. Shimizu, "Low-noise and gain-flattened fluoride-based $Er^{3+}$-doped fiber amplifier pumped by 0.97 μm laser diode," *Optics Letters*, vol. 22, pp. 1235–1237, 1997). However, efficiency loss due to ESA will likely be higher in this configuration than if the pump directions are reversed. Therefore, the optimum arrangement of the pumps will have to be determined on a case by case basis.

Figure 3A:
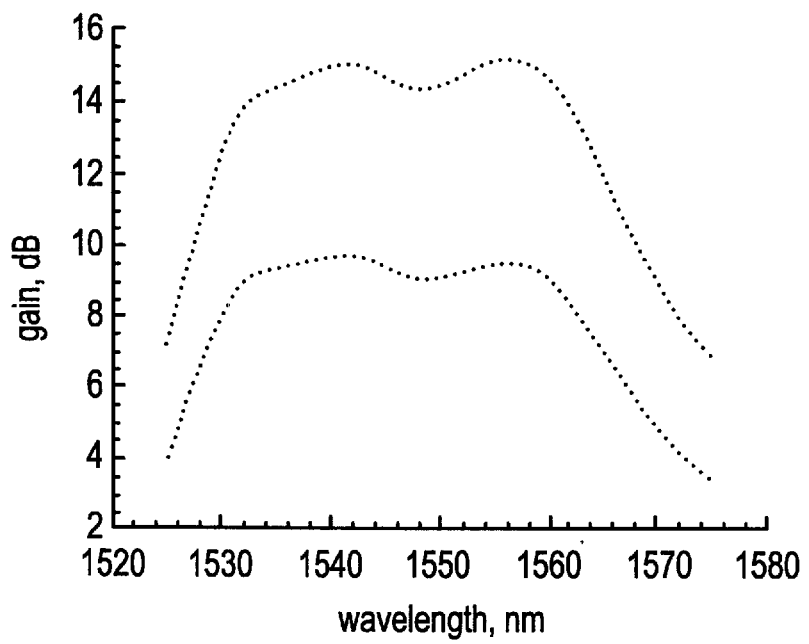
FIG. 3A and FIG. 3B are plots of pairs of gain spectra from the EDFA of FIG. 2.
Figure 3B:
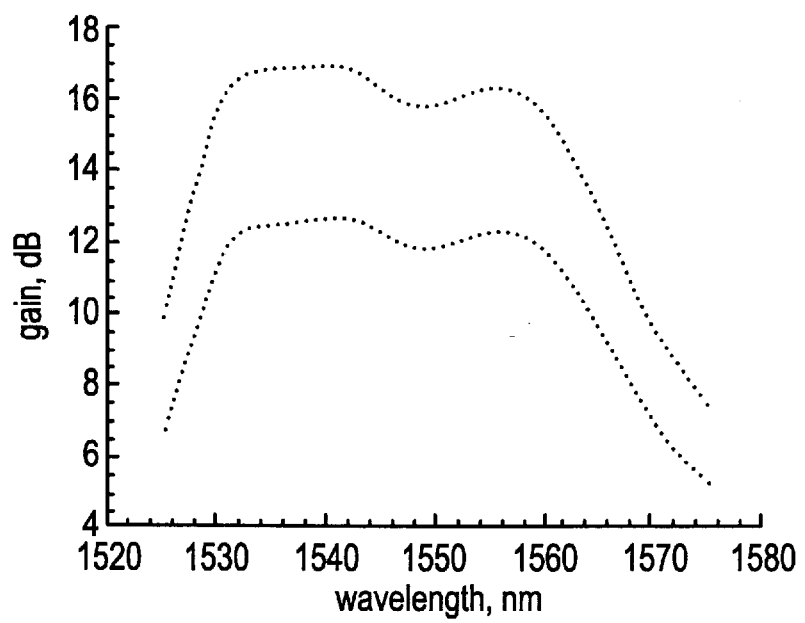

FIG. 3A and FIG. 3B show gain spectra of the amplifier described above as measured with a broadband source and the time-domain extinction technique. All spectra were measured on the same amplifier. The higher gain spectra were measured using predominantly 1480 nm band pump light. The lower gain spectra were obtained by increasing the amount of pump light at 980 nm and reducing the amount of 1480 nm pump light. The pairs of curves in FIG. 3A and FIG. 3B demonstrate how the gain was significantly reduced without the large change in gain shape that normally accompanies such a gain change.

Figure 4:
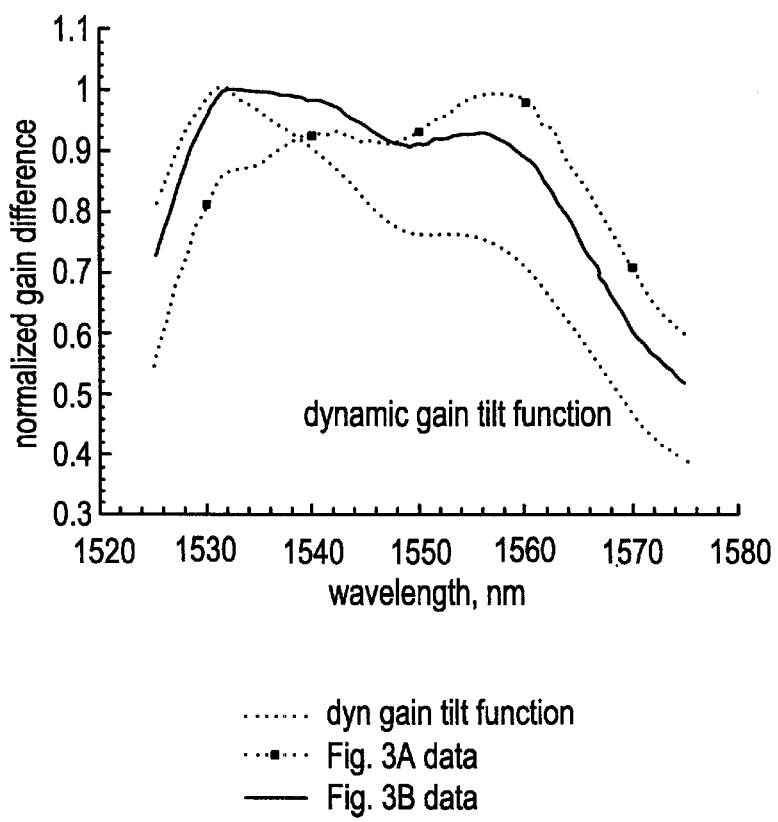
FIG. 4 is a plot of normalized gain difference derived from the data in FIG. 3A and FIG. 3B.

This is further illustrated in FIG. 4 where the differences between the gain curves of FIGS. 3A and 3B are plotted with the dynamic gain tilt function measured for this amplifier using a single 1480 nm band pump. In all cases, the curves have been normalized by their peak value to indicate the wavelength dependence of the gain changes. The dynamic gain tilt function represents the amount of gain variation that one gets from pump/signal power adjustments alone which simply change the average inversion. The relative variation in the data derived from FIG. 3A and FIG. 3B is significantly smaller than for a conventional amplifier. The slope of the normalized gain difference (larger gain minus smaller) curves for the present amplifier can be made to have either a positive or negative slope, or by proper interpolation, a zero slope. The latter is the typical arrangement, but the ability to change sign can be used to provide compensation of gain slope errors in systems consisting of multiple amplifier technologies. To determine the appropriate amounts of pump and auxiliary "control pump" light to apply for a specific need (such as providing the spectrally flattest gain reduction possible) one can perform a series of measurements of the amplifier gain spectrum under conditions which match the actual deployment conditions while using measured amounts of the various pump powers. A look-up table relating drive currents to gain shapes and input powers can then be derived. Intermediate gain spectra can then be interpolated between the excitation powers used in the calibration measurements.

Figure 5:
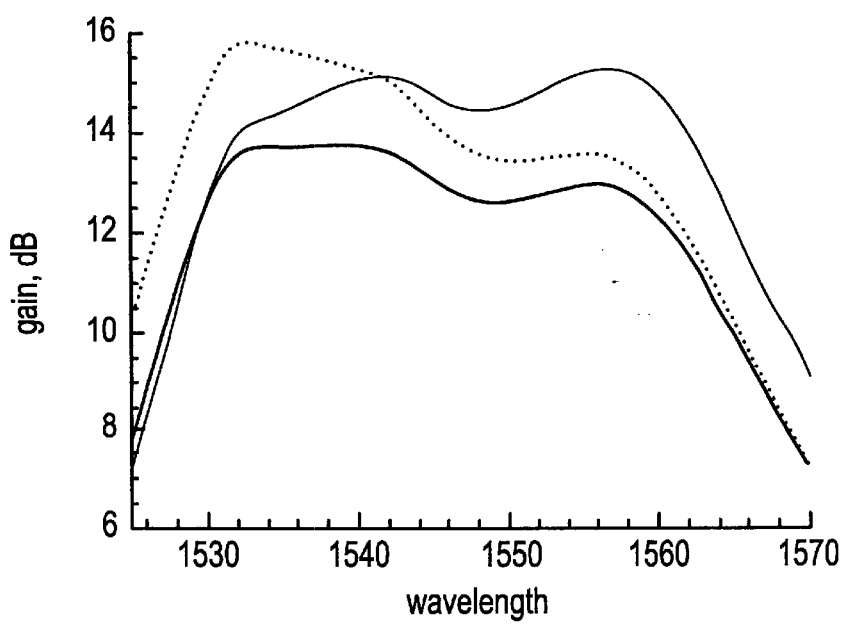
FIG. 5 is a plot which shows that an expanded range of gain spectra are available using the techniques of the present invention.

Because of the ability to independently control the magnitude of the gain from the amplifier and the effective average inversion of the amplifier (which determines the shape of the gain spectrum), one has much more control of the spectrum of an amplifier than was previously possible. While Eqn. (3) predicts that the gain spectrum of a particular amplifier is constrained to a single parameter family of curves which do not cross, FIG. 5 shows that a significantly expanded range of gain spectra are available using the methods described here. For example, the two upper curves can be made to cross thereby providing higher gains to the two ends of the gain spectrum.

Changes in pump wavelength within the 980 nm pump band of erbium-doped silica based fibers manifest themselves as changes in gain slope in the longer wavelength portion of the erbium gain band (~1540–1565 nm) (K. W. Bennett, F. Davis, P. A. Jakobson, N. Jolley, R. Keys, M. A. Newhouse, S. Sheih, and M. J. Yadlowsky, "980 nm band pump wavelength tuning of the gain spectrum of EDFAs," in Optical Amplifiers and their Applications, 1997 OSA Technical Digest Series, Vol. (Optical Society of America, Washington, D.C.) $PD^4$-1-PDR4). Since the present invention can be used to change gain slope in that region it provides a potential means of compensating for this effect, though the powers needed may be high in Er/aluminum doped silica.

The gain spectral control described above can be achieved through the use of other combinations of pump wavelengths. For example, the ESA of erbium at 850 nm can be used to excite ions into the $^4S_{3/2}$ level. From this state the typical decay path is a non-radiative cascade back to the metastable level. The time it takes for this process to occur, which is highly host material dependent, represents time during which an ion cannot take pab in the 1.5 µm amplification process. The sum of all ion s taking part in the ESA process, therefore, reduces $f_{act}$. The use of ESA around 850 nm to separately control $f_{act}$ and the average inversion may provide more independent control of these parameters. By optimizing the wavelength around the ESA peak to maximize the ratio of ESA to ground state absorption (GSA), the pump function and the gain control operation can be decoupled relative to the 1480 nm 980 nm band pumping, though this may in some cases come at the expense of requiring higher total pump powers. Similar arguments hold for other ESA lines of erbium (e.g., 1140 nm, 790 nm etc.) (or other dopants). The 850 nm ESA band, however, has the practical advantage that low-cost GaAs diode laser technology is available in the appropriate wavelength band. The power required at the auxiliary "pump" or ESA wavelength will, in general, be related to the time is takes for the ion to spontaneously decay from the "trapping" state or states back into the ground state or the metastable level and again participate in the amplification process. The longer this process takes, the less power that will be needed, all other things being equal. This suggests the use of ESA levels with long lifetimes, or levels which decay into long lifetime levels. Furthermore, it suggests the use of low phonon energy glasses for which the excited states will generally have longer lifetimes. An exception to the above argument occurs when an additional ESA process happens which has detrimental effects. Lacking pathological outcomes, additional ESA may not pose a problem. The potential with higher order ESA includes excitation of states with shorter lifetimes than the target (thereby requiring additional auxiliary "pump" power) or upconversion cascades which promote an ion over the band-gap and potentially lead to photodarkening.

The above approaches should also be applicable to rare-earth doped amplifiers other than erbium if the dopants have the appropriate auxiliary energy levels outside of the amplifying transition.

Finally, the above described embodiments of the invention are intended to be illustrative only. Numerous alternative embodiments may be devised by those skilled in the art without departing from the spirit and scope of the following claims.

What is claimed is:

1. A method for operating an optical amplifier comprising an optical fiber segment doped with impurity ions comprising the steps of:
   (1) pumping said optical fiber segment with a first pumping wavelength,
   (2) pumping said optical fiber segment with a second pumping wavelength,
   (3) selecting a pumping power of at least one of said first and second wavelengths to thereby select a scale factor for a gain spectrum of said optical amplifier without changing a shape of said gain spectrum as a function of wavelength.

2. The method of claim 1 wherein said ions are erbium ions.

3. The method of claim 1 wherein said optical fiber segment is formed from a low phonon energy glass.

4. The method of claim 1 wherein said glass is a tellurite or a fluoride glass.

5. The method of claim 4 wherein said optical fiber segment is formed from ZBLAN glass.

6. The method of claim 1 wherein one of said first and second pumping wavelengths is 980 nm and the other of said first and second pumping wavelengths is 1480 nm.

7. The method of claim 1 wherein said selecting step comprises the step of selecting a pumping power of both said first and second pumping wavelengths.

8. The method of claim 1 wherein one of said pumping wavelengths propagates codirectionally with an optical signal propagating in said optical fiber segment and the other of said pumping wavelengths propagates counter directionally with said optical signal in said optical fiber segment.

9. A method of operating an optical amplifier comprising an optical fiber segment doped with impurity ions comprising the steps of:
   (a) pumping said ions with a first pumping wavelength from a first ground state to a second metastable state, said metastable state decaying to said ground state via stimulated emission to supply optical gain to an optical signal propagating in said optical fiber segment,
   (b) pumping said ions with a second pumping wavelength from said ground state to a third state, said third state decaying to said metastable state, and
   (c) selecting a scale factor for an optical gain spectrum of said optical amplifier without substantially varying a shape of said optical gain spectrum as a function of wavelength by controlling a pumping power of at least one of said first and second pumping wavelengths and thereby controlling a fraction of said ions in said metastable state.

10. The method of claim 9 wherein said optical fiber segment comprises a low phonon energy glass.

11. The method of claim 9 wherein
   (a) said ions are erbium ions,
   (b) said first pumping wavelength is 1480 nm
   (c) said metastable state is $^4I_{13/2}$
   (d) said second pumping wavelength is 980 nm, and
   (e) said third state $^4I_{11/2}$.

12. The method of claim 11 wherein said selecting step comprises selecting a pumping power of said 980 nm pumping wavelength.

13. The method of claim 9 wherein one of said pumping wavelengths propagates codirectionally with said optical signal in said optical fiber segment and the other of said pumping wavelengths propagates counter-directionally to said optical signal in said optical fiber segment.

14. An optical fiber amplifier comprising:
   an optical fiber segment doped with impurity ions for providing optical gain for an optical signal propagating in said optical fiber segment;
   a first source of a first pumping wavelength for pumping said ions from a first ground state to a second metastable state, which metastable state decays to said first ground state via stimulated emission to supply said optical gain;
   a second source of a second pumping wavelength for pumping said ions from said ground state to a third state, which third state decays to said second metastable state; and a circuit for selecting a scale factor for an optical gain spectrum of said optical amplifier without varying a shape of said optical gain spectrum as a function of wavelength by controlling a pumping power of at least one of said pumping wavelengths, and thereby controlling a fraction of said ions in said metastable state.

15. The optical fiber amplifier of claim 14 wherein said optical fiber segment comprises a low phonon energy glass.

16. The fiber amplifier of claim 15, wherein:

(a) said ions are erbium ions;

(b) said first pumping wavelength is 1480 nm;

(c) said metastable state is $^4I_{13/2}$;

(d) said second pumping wavelength is 980 nm; and (e) said third state is $^4I_{11/2}$.

17. An optical fiber amplifier comprising:

an optical fiber segment formed from a low phonon energy glass and doped with impurity ions for providing optical gain for an optical signal propagating in said optical fiber segment, a first source of a first pumping wavelength for pumping some of said ions from a first ground state to a second metastable state, which metastable state decays to said first ground state, and a second source of a second pump wavelength for pumping some of said ions from said ground state to a third auxiliary state, which auxiliary state decays to said second metastable state.

18. The amplifier of claim 17, wherein the time it takes an ion to go from said ground state to said metastable state via said auxiliary state is at least 1 ms.

19. A method for operating an optical amplifier comprising an optical fiber segment doped with impurity ions to amplify an optical signal propagating in said fiber segment, said method comprising the steps of:

pumping said optical fiber segment with a first pumping wavelength and a second pumping wavelength, said that a controllable fraction of the ions are in an energy state such that they do not interact with said signal propagating in said fiber segment so as to independently control a shape and magnitude of a gain spectrum of said amplifier.

* * * * *